United States Patent
Kawabe et al.

(10) Patent No.: US 9,755,207 B2
(45) Date of Patent: Sep. 5, 2017

(54) PRESSURE-SENSITIVE ADHESIVE TAPE FOR BATTERY AND BATTERY USING THE PRESSURE-SENSITIVE ADHESIVE TAPE

(75) Inventors: Shigeki Kawabe, Osaka (JP); Yuichi Takamura, Osaka (JP); Jun Iwata, Osaka (JP); Hiroomi Hanai, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 82 days.

(21) Appl. No.: 13/405,661

(22) Filed: Feb. 27, 2012

(65) Prior Publication Data

US 2012/0219835 A1    Aug. 30, 2012

(30) Foreign Application Priority Data

Feb. 28, 2011 (JP) ................. 2011-041360
Dec. 4, 2011 (JP) ................. 2011-265355
Feb. 16, 2012 (JP) ................. 2012-032009

(51) Int. Cl.
*H01M 2/00* (2006.01)
*C09J 7/02* (2006.01)
(Continued)

(52) U.S. Cl.
CPC ......... *H01M 2/1673* (2013.01); *C09J 7/0246* (2013.01); *H01M 2/32* (2013.01);
(Continued)

(58) Field of Classification Search
CPC .............. C09J 2201/622; C09J 2203/33; C09J 2423/00; C09J 2433/00; C09J 2451/00;
(Continued)

(56) References Cited

U.S. PATENT DOCUMENTS 6,120,866 A * 9/2000 Arakawa ............... A61F 13/58
                                                       428/355 R
6,310,134 B1   10/2001 Templeton et al.
(Continued)

FOREIGN PATENT DOCUMENTS

CN    101602919 A    12/2009
CN    101824282 A    9/2010
(Continued)

OTHER PUBLICATIONS

European Search Report dated Jun. 4, 2012 issued by the European Patent Office in counterpart European Patent Application No. 12157026.1.

(Continued)

*Primary Examiner* — Carlos Barcena
(74) *Attorney, Agent, or Firm* — Sughrue Mion, PLLC

(57) ABSTRACT

The present invention relates to a pressure-sensitive adhesive tape for battery containing: a substrate; and a pressure-sensitive adhesive layer provided on at least one side of the substrate, in which the pressure-sensitive adhesive tape has a thickness change ratio of 20% or less after immersion in a mixed solvent of ethylene carbonate/diethyl carbonate [former/latter (volume ratio)=1/1] at 60° C. for 8 hours; and a 180° peeling adhesive strength (against aluminum foil, peel temperature: 25° C., peel rate: 300 mm/minute) of 0.5 N/10 mm or more after the above immersion.

4 Claims, 2 Drawing Sheets

(51) Int. Cl.
*H01M 2/16* (2006.01)
*H01M 2/32* (2006.01)
*H01M 10/04* (2006.01)
*H01M 10/052* (2010.01)
*H01M 10/0587* (2010.01)

(52) U.S. Cl.
CPC ..... *H01M 10/0431* (2013.01); *H01M 10/052* (2013.01); *H01M 10/0587* (2013.01); *C09J 2201/622* (2013.01); *C09J 2203/33* (2013.01); *C09J 2423/00* (2013.01); *C09J 2433/00* (2013.01); *C09J 2451/00* (2013.01); *C09J 2483/00* (2013.01); *H01M 2/168* (2013.01); *Y10T 428/28* (2015.01); *Y10T 428/2878* (2015.01); *Y10T 428/2891* (2015.01)

(58) Field of Classification Search
CPC .. C09J 2483/00; C09J 7/0246; H01M 10/052; H01M 10/0587; H01M 2/1673; H01M 2/168; H01M 2/32; H01M 10/0431
See application file for complete search history.

(56) References Cited

U.S. PATENT DOCUMENTS

| | | | |
|---|---|---|---|
| 6,448,339 B1* | 9/2002 | Tomita | C09J 7/0246 525/217 |
| 6,730,440 B1 | 5/2004 | Bauer et al. | |
| 8,592,033 B2 | 11/2013 | Terashima et al. | |
| 2002/0192542 A1 | 12/2002 | Luski et al. | |
| 2004/0229066 A1 | 11/2004 | Ikishima et al. | |
| 2005/0256251 A1* | 11/2005 | Amano | C09J 7/0217 524/505 |
| 2006/0093922 A1* | 5/2006 | Kim | C09J 7/0264 429/251 |
| 2008/0152997 A1* | 6/2008 | Lee | H01M 2/0413 429/174 |
| 2010/0221585 A1 | 9/2010 | Terashima et al. | |
| 2011/0162782 A1 | 7/2011 | Goubard | |
| 2012/0052295 A1 | 3/2012 | Iwata et al. | |
| 2012/0058335 A1 | 3/2012 | Kamitani et al. | |
| 2012/0107573 A1 | 5/2012 | Iwata et al. | |
| 2012/0196171 A1 | 8/2012 | Ikishima et al. | |

FOREIGN PATENT DOCUMENTS

| | | |
|---|---|---|
| CN | 102618184 A | 8/2012 |
| EP | 2423287 A1 | 2/2012 |
| EP | 2423288 A2 | 2/2012 |
| EP | 2447331 A1 | 5/2012 |
| JP | 6150971 A | 5/1994 |
| JP | 11176476 A | 7/1999 |
| JP | 2004500441 A | 1/2004 |
| JP | 2006089654 A | 4/2006 |
| JP | 2006-286337 A | 10/2006 |
| JP | 3943217 B2 | 7/2007 |
| JP | 4350965 B2 | 10/2009 |
| JP | 4412966 B2 | 2/2010 |
| JP | 2010205467 A | 9/2010 |
| WO | 2010/012906 A1 | 2/2010 |

OTHER PUBLICATIONS

Office Action, dated for Nov. 4, 2013, issued by the State Intellectual Property Office of the People's Republic of China in counterpart Chinese Application No. 201210049110.8.

Office Action, dated May 26, 2014, issued by the State Intellectual Property Office of the People's Republic of China in counterpart Chinese Application No. 201210049110.8.

Notification of Reasons for Refusal, dated Jun. 25, 2015, issued by the Japanese Patent Office in counterpart Japanese Application No. 2012-032009.

Office Action, issued on Feb. 9, 2016, by the Japanese Patent Office in counterpart Japanese Application No. 2012-032009.

Communication issued on Mar. 23, 2015 by the Japanese Patent Office in related Application No. 2012032009.

* cited by examiner

PRESSURE-SENSITIVE ADHESIVE TAPE FOR BATTERY AND BATTERY USING THE PRESSURE-SENSITIVE ADHESIVE TAPE

TECHNICAL FIELD

The present invention relates to a pressure-sensitive adhesive tape used when manufacturing a battery, particularly, a pressure-sensitive adhesive tape to be applied to a place which is immersed in an electrolytic solution in a non-aqueous battery or a place which has a possibility to come into contact with the electrolytic solution; and a battery using the pressure-sensitive adhesive tape.

In secondary batteries in which a non-aqueous electrolytic solution is enclosed, such as a nickel hydrogen battery and a lithium ion battery, in the manufacturing process thereof, a pressure-sensitive adhesive tape is used for various applications, for example, for the purpose of preventing penetration of an impurity or burr into a separator, for the purpose of preventing stripping-off of the active material, and for the purpose of improving insertion competence of an electrode into a battery case.

A pressure-sensitive adhesive agent constituting the pressure-sensitive adhesive tape to be used in the above use applications is selected mainly in consideration of adhesiveness to an adherend. When the pressure-sensitive adhesive tape is stripped off in an electrolytic solution, it is known that electrolytic solution properties are lowered by dropping out an active material and reacting a pressure-sensitive adhesive component eluted to the electrolytic solution with the electrolyte to thereby lower battery properties (Patent Document 1 etc.).

However, there is still a problem that lowering of the battery properties are caused even when a pressure-sensitive adhesive tape, which is excellent in adhesiveness and is not stripped off in the electrolytic solution, is used. Namely, it is a present situation that a pressure-sensitive adhesive tape capable of preventing penetration of an impurity or burr into a separator, preventing stripping-off of an active material, and improving insertion competence of an electrode into a battery case without causing the lowering of the battery properties, has not been found.

Patent Document 1: JP-A-11-176476

SUMMARY OF THE INVENTION

Therefore, an object of the present invention is to provide a pressure-sensitive adhesive tape for battery capable of preventing penetration of an impurity or burr into a separator, preventing stripping-off of an active material, and improving insertion competence of an electrode into a battery case, without causing the lowering of the battery properties.

Another object of the present invention is to provide a battery wherein the pressure-sensitive adhesive tape for battery is attached to a battery-constituting member.

The present inventors have made extensive studies for solving the above problems. A non-aqueous electrolytic solution secondary battery has a configuration that a laminated body composed of positive-electrode plate/separator/negative-electrode plate is wound and stored in a battery case in a state that the winding-end part is fixed with a pressure-sensitive adhesive tape (in a state that the laminated body substantially does not come loose). As a result of the studies, they have found that the positive and negative electrodes are pressed when the pressure-sensitive adhesive tape attached inside the battery comes into contact with the electrolytic solution and is then swollen, and by the stress owing to the pressure, destruction of the positive and negative electrodes and the separator, decrease in close adhesion between the collector and the active material, and the like occur, to thereby cause the lowering of the battery properties.

Also, they have found the following: when a pressure-sensitive adhesive tape having such an adhesive strength that the tape is not peeled even when it is immersed in the electrolytic solution and having a thickness change ratio of a specific value or less even when it is immersed in the electrolytic solution is used, the lowering of the electrolytic solution properties is not caused, and the destruction of the positive and negative electrodes and the separator, the decrease in close adhesion between the collector and the active material, and the like owing to the pressure are not caused, so that prevention of the penetration of an impurity or burr into a separator, prevention of the stripping-off of the active material, and improvement of the insertion competence of an electrode into a battery case can be achieved with maintaining excellent battery properties. The present invention has been accomplished based on these findings.

That is, the present invention provides a pressure-sensitive adhesive tape for battery comprising:

a substrate; and a pressure-sensitive adhesive layer provided on at least one side of the substrate, wherein the pressure-sensitive adhesive tape has a thickness change ratio of 20% or less after immersion in a mixed solvent of ethylene carbonate/diethyl carbonate [former/latter (volume ratio)=1/1] at 60° C. for 8 hours; and a 180° peeling adhesive strength (against aluminum foil, peel temperature: 25° C., peel rate: 300 mm/minute) of 0.5 N/10 mm or more after the above immersion.

It is preferred that the pressure-sensitive adhesive layer contains a pressure-sensitive adhesive agent selected from the group consisting of acrylic pressure-sensitive adhesive agents, rubber-based pressure-sensitive adhesive agents, silicone-based pressure-sensitive adhesive agents, and polyolefin-based pressure-sensitive adhesive agents.

It is preferred that the pressure-sensitive adhesive layer contains a polyolefin-based pressure-sensitive adhesive agent and the polyolefin-based pressure-sensitive adhesive agent contains a maleic acid-modified polyolefin and/or a maleic anhydride-modified polyolefin.

It is preferred that the pressure-sensitive adhesive layer contains a polyolefin-based pressure-sensitive adhesive agent and the polyolefin-based pressure-sensitive adhesive agent contains a maleic acid-modified polyolefin and/or a maleic anhydride-modified polyolefin. And it is also preferred that the pressure-sensitive adhesive layer contains a rubber-based pressure-sensitive adhesive agent and the rubber-based pressure-sensitive adhesive agent contains a maleic acid-modified elastomer and/or a maleic anhydride-modified elastomer.

The pressure-sensitive adhesive tape for battery is preferably used for a use application of fixing an active material to the substrate by attachment to a boundary part between a portion to which the active material is applied and a portion to which the active material is not applied on an electrode plate, or for a use application of fixing a laminated body having a structure of positive-electrode plate/separator/negative-electrode plate or fixing a winding body of the laminated body.

The present invention further provides a battery which comprises a battery-constituting member and the above pressure-sensitive adhesive tape for battery attached to the battery-constituting member.

The pressure-sensitive adhesive tape for battery according to the present invention suppresses its swelling even when immersed in an electrolytic solution and the tape can maintain excellent adhesiveness and thus can hold an adherend even in the electrolytic solution. Therefore, in the production of batteries, by applying the tape to a portion to be immersed in the electrolytic solution or a portion having a possibility to come into contact with the electrolytic solution, prevention of the penetration of an impurity or burr into a separator, prevention of the stripping-off of the active material, and improvement of the insertion competence of an electrode into a battery case can be achieved with suppressing deterioration of the electrolytic solution and destruction of the positive and negative electrode active material.

DESCRIPTION OF REFERENCE NUMERALS AND SIGNS

Figure 1:
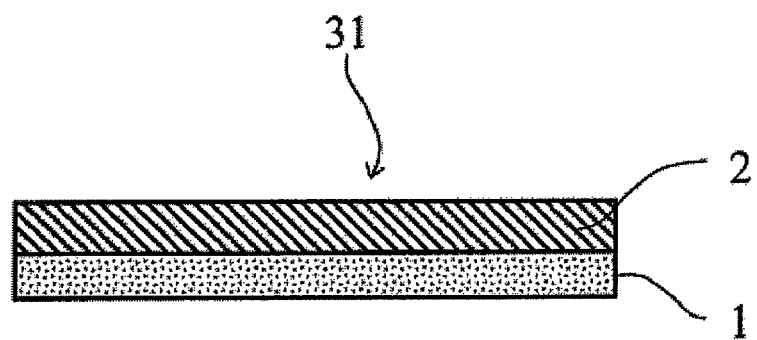
FIG. 1 is a schematic cross-sectional view showing one embodiment of the pressure-sensitive adhesive tape for battery according to the present invention.

1: Substrate
2, 21, 22: Pressure-sensitive adhesive layer
3, 31, 32: Pressure-sensitive adhesive tape for battery
4: Electrode terminal
5: Positive-electrode plate
6: Negative-electrode plate
7: Separator
8: Active material

MODE FOR CARRYING OUT THE INVENTION

The following will specifically describe embodiments of the present invention with reference to the drawings, as necessary.

FIG. 1 is a schematic cross-sectional view showing one embodiment of the pressure-sensitive adhesive tape for battery according to the present invention and the pressure-sensitive adhesive tape 31 for battery has a configuration that a pressure-sensitive adhesive layer 2 is laminated on one side of a substrate 1.

Figure 2:
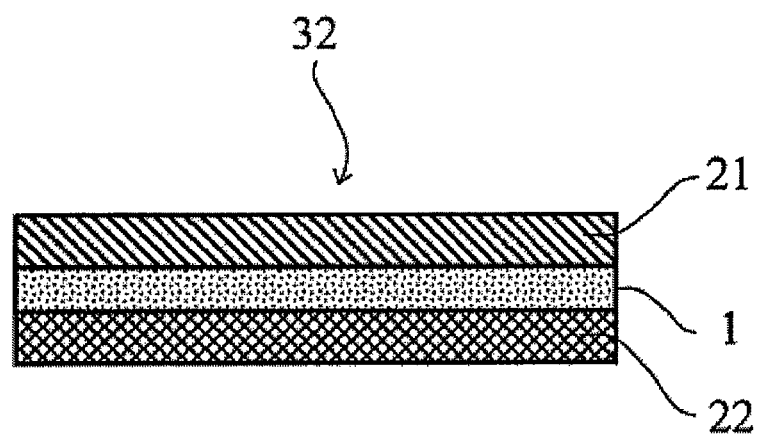
FIG. 2 is a schematic cross-sectional view showing another embodiment of the pressure-sensitive adhesive tape for battery according to the present invention.

FIG. 2 is a schematic cross-sectional view showing another embodiment of the pressure-sensitive adhesive tape for battery according to the present invention and the pressure-sensitive adhesive tape 32 for battery has a configuration that a pressure-sensitive adhesive layer 21 is laminated on one side of a substrate 1 and a pressure-sensitive adhesive layer 22 is laminated on the other side thereof.

[Pressure-Sensitive Adhesive Layer]

Examples of a pressure-sensitive adhesive agent (base polymer) constituting the pressure-sensitive adhesive layer in the present invention include acrylic pressure-sensitive adhesive agents, rubber-based pressure-sensitive adhesive agents, silicone-based pressure-sensitive adhesive agents, and polyolefin-based pressure-sensitive adhesive agents. They may be used either alone or in combination of two or more thereof.

(Acrylic Pressure-Sensitive Adhesive Agent)

For the above acrylic pressure-sensitive adhesive agent, the content of an alkyl (meth)acrylate ester having an alkyl group having less than 4 carbon atoms is preferably less than 20 wt %, more preferably less than 5 wt %, particularly preferably less than 0.1 wt %, and most preferably 0 wt %, based on the total amount (100 wt %) of the monomer components constituting the acrylic pressure-sensitive adhesive agent. This is because, when 20 wt % or more of the alkyl (meth)acrylate ester having an alkyl group having less than 4 carbon atoms is contained in the polymer, an electrolytic solution easily enters into molecular chains upon the immersion of the layer in the electrolytic solution and the layer tends to be rapidly expanded and is easily peeled in the electrolytic solution since the alkyl group having less than 4 carbon atoms has hydrophilicity. As the acrylic pressure-sensitive adhesive agent in the present invention, it is preferred to use a polymer obtained by using an alkyl (meth)acrylate ester having an alkyl group having 4 or more carbon atoms, which has hydrophobicity, as a main monomer and polymerizing the above main monomer with a functional group-containing monomer that improves adhesiveness.

Examples of the main monomer include alkyl (meth)acrylate esters having a straight or branched alkyl group having 4 to 20 carbon atoms, such as n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. In this Specification, "(meth)acryl" means "acryl" and/or "methacryl".

Among the above monomers, alkyl (meth)acrylate esters having an alkyl group having 4 to 12 carbon atoms (for example, 2-ethylhexyl acrylate (2EHA) and n-butyl acrylate (BA)) are preferable, and particularly, alkyl (meth)acrylate esters having an alkyl group having 5 to 12 carbon atoms (for example, 2-ethylhexyl acrylate (2EHA)) are preferable.

The content of the main monomer is preferably, for example, about 50 to 100 wt % based on the total amount (100 wt %) of the monomer components constituting the acrylic pressure-sensitive adhesive agent. The upper limit of the content of the main monomer is more preferably 99 wt % and particularly preferably 98 wt %. The lower limit of the content of the main monomer is more preferably 70 wt %, further preferably 75 wt %, and particularly preferably 80 wt %.

Examples of the above functional group-containing monomer include carboxyl group-containing monomers such as (meth)acrylic acid, itaconic acid, maleic acid, fumaric acid, crotonic acid, isocrotonic acid (including acid anhydride group-containing monomers such as maleic anhydride and itaconic anhydride); hydroxyl group-containing monomers, including hydroxyalkyl (meth)acrylates such as 2-hydroxyethyl (meth)acrylate, 2-hydroxypropyl (meth) acrylate, 3-hydroxypropyl(meth)acrylate, 4-hydroxybutyl (meth)acrylate, and 6-hydroxyhexyl(meth)acrylate, vinyl alcohols, and allyl alcohols; amide group-containing monomers such as (meth)acrylamide; N-substituted amide group-containing monomers such as N-methyl(meth)acrylamide, N-ethyl(meth)acrylamide, N,N-dimethyl(meth)acrylamide, N-t-butyl(meth)acrylamide, N-methylol(meth)acrylamide, N-methoxymethyl(meth)acrylamide, N-ethoxymethyl (meth)acrylamide, N-butoxymethyl(meth)acrylamide, N-octylacrylamide, and N-hydroxyethylacrylamide; amino group-containing monomers such as aminoethyl(meth)acrylate, dimethylaminoethyl(meth)acrylate, diethylaminoethyl (meth)acrylate, dimethylaminopropyl(meth)acrylate, and t-butylaminoethyl(meth)acrylate; and glycidyl group-containing monomers such as glycidyl(meth)acrylate and methylglycidyl (meth)acrylate. Among these functional group-containing monomers, the carboxyl group-containing monomers are preferable in view of an excellent adhesion reliability in the electrolytic solution, and acrylic acid (AA) is more preferable.

The content of the functional group-containing monomer is preferably less than 20 wt % based on the total amount (100 wt %) of the monomer components constituting the acrylic pressure-sensitive adhesive agent. The upper limit of the content of the functional group-containing monomer is more preferably 10 wt %, further preferably 7 wt %, and particularly preferably 5 wt %. The lower limit of the content of the functional group-containing monomer is, for example, 0.1 wt %, preferably 1 wt %, and particularly preferably 3 wt %.

The acrylic pressure-sensitive adhesive agent can be prepared by polymerizing the above-mentioned monomer components by a known or commonly used polymerization method. Examples of the method include a solution polymerization, an emulsion polymerization, a bulk polymerization or a polymerization by irradiation with an active energy beam (an active energy beam polymerization). Among the above polymerization methods, the solution polymerization and the active energy beam polymerization is preferable and the solution polymerization is more preferable, in terms of transparency, water resistance, cost and the like.

In the above solution polymerization, various kinds of general solvents can be used. Examples of the solvent include organic solvents including esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. The solvents may be used either alone or in combination of two or more thereof.

In the polymerization for the acrylic pressure-sensitive adhesive agent, a polymerization initiator can be used. The polymerization initiator is not particularly limited, and can be appropriately selected from known or commonly used initiators. Examples of the polymerization initiators include oil-soluble polymerization initiators including azo-based polymerization initiators such as 2,2'-azobisisobuyronitrile, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), and dimethyl-2,2'-azobis(2-methylpropionate); and peroxide-based polymerization initiators such as benzoyl peroxide, t-butyl hydroperoxide, di-t-butyl peroxide, t-butyl peroxybenzonate, dicoumyl peroxide, 1,1-bis(t-butylperoxy)-3,3,5-trimethylcyclohexane and 1,1-bis(t-butylperoxy)cyclododecane. They may be used either alone or in combination of two or more thereof. The amount of the polymerization initiator used is not particularly limited, and may be in a known range available as a polymerization initiator.

The acrylic pressure-sensitive adhesive agent may be crosslinked by adding a crosslinking agent. Examples of the crosslinking agent include various crosslinking agents such as epoxy-based compounds, isocyanate-based compounds, metal chelate compounds, metal alkoxides, metal salts, amine compounds, hydrazine compounds and aldehyde-based compounds. They may be appropriately selected depending on the functional group contained in the acrylic pressure-sensitive adhesive agent and used. The amount of the crosslinking agent used is, for example, about 0.01 parts by weight to 10 parts by weight and preferably about 0.05 parts by weight to 5 parts by weight based on 100 parts by weight of the acrylic pressure-sensitive adhesive agent.

(Rubber-Based Pressure-Sensitive Adhesive Agent)

The rubber-based pressure-sensitive adhesive agents may be a natural rubber or various synthetic rubbers. Examples of the synthetic rubbers include polyisoprene rubber, styrene-butadiene (SB) rubber, styrene-isoprene (SI) rubber, styrene-isoprene-styrene block copolymer (SIS) rubber, styrene-butadiene-styrene block copolymer (SBS) rubber, styrene-ethylene-butylene-styrene block copolymer (SEBS) rubber, styrene-ethylene-propylene-styrene block copolymer (SEPS) rubber, styrene-ethylene-propylene block copolymer (SEP) rubber, reclaimed rubber, butyl rubber, polyisobutylene, and modificates thereof.

In the present invention, among these rubbers, polyisoprene rubber, styrene-ethylene-butylene-styrene block copolymer (SEBS) rubber, styrene-ethylene-propylene-styrene block copolymer (SEPS) rubber, butyl rubber or the like is preferably used in view of the fact that they are hard to be eluted to the electrolytic solution and even when they are eluted to the electrolytic solution, the reactivity with the electrolyte in the electrolytic solution is low, therefore it is possible to prevent deterioration of the electrolytic solution.

In the present invention, acid modified elastomers such as a maleic acid-modified elastomer and/or a maleic anhydride-modified elastomer, which are obtained by graft polymerization of maleic acid and/or maleic anhydride to the above rubber-based pressure-sensitive adhesive agent, may be used. By using the acid modified elastomer, it becomes possible to further enhance the adhesion reliability in the electrolytic solution.

The graft ratio of the acid-modified elastomer is, for example, about 0.05 wt % to 10.0 wt %, preferably 0.1 wt % to 5.0 wt % based on the elastomer to be grafted. When the graft ratio is less than the above range, adhesive strength may be insufficient and there is a tendency that the tape is easily peeled in the electrolytic solution. On the other hand, when the graft ratio is more than the above range, the resin may aggregate and compatibility and dispersibility may decrease, so that production efficiency tends to decrease.

The acid-modified elastomer can be prepared by a known and conventional method. For example, it can be prepared by a method of melt-kneading an elastomer (i.e., an elastomer before acid modification) with an unsaturated carboxylic acid and/or an acid anhydride thereof in the presence of a radical generator such as an organic peracid or a peroxide.

(Silicone-Based Pressure-Sensitive Adhesive Agent)

Examples of the above-mentioned silicone-based pressure-sensitive adhesive agents include silicone rubbers or silicone resins containing an organopolysiloxane as a main component, or polymers obtained by crosslinking or polymerizing the silicone rubbers or the silicone resins by adding a crosslinking agent such as a siloxane-based crosslinking agent or a peroxide-based crosslinking agent.

(Polyolefin-Based Pressure-Sensitive Adhesive Agent)

As the above-mentioned polyolefin-based pressure-sensitive adhesive agent, it is preferred to use an acid-modified polyolefin in view of the fact that an excellent adhesive strength can be maintained even upon immersion in the electrolytic solution. The acid-modified polyolefin is a compound obtained by graft polymerization of an unsaturated carboxylic acid and/or an acid anhydride thereof to a polyolefin. Examples thereof include those wherein an unsaturated carboxylic acid and/or an acid anhydride thereof is bonded to a polyolefin as a main chain through any carbon adjacent to the carbonyl group contained therein to form a side chain.

In the present invention, among the acid-modified polyolefins, particularly, in view of excellent adhesion reliability in the electrolytic solution, it is preferred to use a maleic acid-modified polyolefin and/or a maleic anhydride-modified polyolefin (i.e., an acid-modified polyolefin obtained by graft polymerization of maleic acid and/or maleic anhydride to a polyolefin).

The acid-modified polyolefin can be prepared by a known and conventional method. For example, it can be prepared by a method of melt-kneading a polyolefin (i.e., a polyolefin before acid modification) and an unsaturated carboxylic acid and/or an acid anhydride thereof in the presence of a radical generator such as an organic peracid or a peroxide.

Examples of the polyolefin before acid modification in the acid-modified polyolefin include homopolymers of α-olefins having 2 to 10 carbon atoms, such as ethylene, propylene, 1-butene, 1-hexene, 3-methyl-1-butene, 4-methyl-1-pentene, 1-heptene, 1-octene, and 1-decene; random or block copolymers of two or more kinds of the above α-olefins; random, block or graft copolymers of the above α-olefin with other monomer(s); or mixtures thereof.

In the present invention, among them, a polyolefin selected from ethylene-based resins such as high-density polyethylene, low-density polyethylene and ethylene-vinyl acetate copolymer (EVA), and propylene-based resins such as polypropylene is preferable in view of low cost and low-temperature adhesiveness.

The graft ratio of the acid-modified polyolefin is, for example, about 0.05 wt % to 10.0 wt %, preferably about 0.1 wt % to 5.0 wt % based on the polyolefin to be grafted. When the graft ratio is less than the above range, adhesive strength may be insufficient and there is a tendency that the tape is easily peeled in the electrolytic solution. On the other hand, when the graft ratio is more than the above range, the resin may aggregate and compatibility and dispersibility may decrease, so that production efficiency tends to decrease.

The pressure-sensitive adhesive layer according to the present invention contains the above pressure-sensitive adhesive agent. Furthermore, the pressure-sensitive adhesive layer according to the present invention may contain another component(s) (e.g., appropriate crosslinking agents, tackifiers, plasticizers, fillers, antioxidants, etc.) in addition to the base polymer.

The total thickness of the pressure-sensitive adhesive layer of the present invention is preferably 2 μm to 100 μm (particularly preferably, about 2 μm to 50 μm, and especially preferably 2 μm to 20 μm). When the thickness of the pressure-sensitive adhesive layer is less than the above range, the adhesive strength may decrease and there is a tendency that the pressure-sensitive adhesive tape is peeled in the electrolytic solution and the electrolytic solution is deteriorated. On the other hand, when the thickness of the pressure-sensitive adhesive layer is more than the above range, a volume occupied in the battery may become exceedingly large, such that it tends to be difficult to implement a high capacity of the battery. The pressure-sensitive adhesive layer of the present invention may be a single layer or a laminated body of two or more layers. In the case where the pressure-sensitive adhesive layer is a laminated body of two or more layers, each layer may have the same composition or may have different compositions. Moreover, in the case where the pressure-sensitive adhesive layers are present on both sides of the substrate, the pressure-sensitive adhesive layers may have the same composition or may have different compositions.

[Substrate]

As the substrate, a substrate that is hardly swollen even when immersed in an electrolytic solution is preferably used. There can be utilized a fiber-based substrate, a paper-based substrate, a plastic-based substrate, a rubber-based substrate, a foamed body, or a laminate thereof. Examples of the material of the plastic-based substrate include polyesters (e.g., polyethylene terephthalate, polyethylene naphthalate, polybutylene terephthalate or polybutylene naphthalate), polyolefines (e.g., polyethylene, polypropylene or ethylene-propylene copolymer), polyvinyl alcohol, polyvinylidene chloride, polyvinyl chloride, vinyl chloride-vinyl acetate copolymer, polyvinyl acetate, polyamides, polyimides, celluloses, fluorine-based resins, polyethers, polyether amides, polyphenylene sulfides, polystyrene-based resins (e.g., polystyrene), polycarbonates and polyethersulfones.

The substrate according to the present invention is preferably the substrate that is hardly dissolved in an electrolytic solution, thereby hardly deteriorating the electrolytic solution.

Above all, as the substrate in the present invention, it is preferred to use a plastic-based substrate including polyimide, polyphenylene sulfide or polyolefines such as polypropylene, in view of the fact that they are hardly swollen even when immersed in an electrolytic solution and hardly cause deterioration of the electrolytic solution. Further, it is more preferred to use polyphenylene sulfide or polypropylene since they are inexpensive.

If necessary, in order to increase close adhesion with the pressure-sensitive adhesive layer, the surface of the substrate may be subjected to a commonly used surface treatment, for example, oxidation treatment by a chemical or physical method, such as chromic acid treatment, ozone exposure, flame exposure, high pressure rapid exposure, and ionization radiation treatment. The thickness of the substrate is not particularly limited, and may be preferably, for example, about 8 μm to 100 μm and more preferably 10 μm to 50 μm. If the thickness of the substrate is smaller than the above range, the strength of the pressure-sensitive adhesive tape may become insufficient, such that practicability may be damaged. On the other hand, if the thickness of the substrate is larger than the above range, a volume occupied in the battery may become excessively large, such that it tends to be difficult to implement a high capacity of the battery.

[Pressure-Sensitive Adhesive Tape for Battery]

The pressure-sensitive adhesive tape for battery according to the present invention has the above pressure-sensitive adhesive layer on at least one side of the above substrate. The pressure-sensitive adhesive tape for battery according to the present invention can be manufactured by a known and commonly used method. For example, a method containing preparing a coating solution containing a pressure-sensitive adhesive agent to be constituting the pressure-sensitive adhesive layer by, as necessary, diluting the pressure-sensitive adhesive agent with a solvent such as toluene, xylene, ethyl acetate, or methyl ethyl ketone, and applying the coating solution directly onto a substrate to form a pressure-sensitive adhesive layer; or a method containing applying the coating solution onto an appropriate separator (e.g., release paper) to form a pressure-sensitive adhesive layer, and transferring the pressure-sensitive adhesive layer onto a substrate, can be mentioned. In the case of the transferring, a void may remain at an interface with the substrate. On such an occasion, the void can be diffused and dissipated by performing heating and pressing treatment by an autoclave treatment or the like.

For the application of the above coating solution, a conventional coater, for example, a gravure-roll coater, a reverse-roll coater, a kiss-roll coater, a dip-roll coater, a bar coater, a knife coater, a spray coater, a comma coater, a direct coater or the like can be used.

Moreover, the pressure-sensitive adhesive tape can be also formed by melt-extrusion molding of the substrate and the pressure-sensitive adhesive agent constituting the above pressure-sensitive adhesive layer. As a method for the melt extrusion, any known technologies such as inflation method and T-die method can be used. Furthermore, after the extrusion molding, stretching to a longitudinal or transverse direction (uniaxial orientation), sequential or simultaneous stretching to longitudinal and transverse directions (biaxial orientation), or the like may be performed.

The pressure-sensitive adhesive tape for battery according to the present invention can be attached to an adherend by, for example, pressing under a pressure of about 0.5 kg/cm$^2$ to 10 kg/cm$^2$. The temperature at pressing is not particularly limited and is, for example, about 10° C. to 180° C. Particularly, in the case where the pressure-sensitive adhesive layer contains a polyolefin-based pressure-sensitive adhesive agent, the temperature is preferably about 100° C. to 160° C.

With regard to the adhesive strength (against aluminum foil) after pressing, for example, 180° peeling adhesive strength at 25° C. against aluminum foil (in accordance with JIS Z 0237:2000, against aluminum foil, peel rate: 300 mm/minute: adhesive strength before immersion) is about 0.5 N/10 mm or more, preferably 1.0 N/10 mm or more, and particularly preferably 1.05 N/10 mm to 2.5 N/10 mm.

Moreover, with regard to the adhesive strength (against aluminum foil) of the pressure-sensitive adhesive tape for battery according to the present invention after immersed in a mixed solvent of ethylene carbonate/diethyl carbonate [former/latter (volume ratio)=1/1] at 60° C. for 8 hours, for example, 180° peeling adhesive strength (in accordance with JIS Z 0237:2000, against aluminum foil, peel temperature: 25° C., peel rate: 300 mm/minute: adhesive strength after immersion) is 0.5 N/10 mm or more, preferably 1.0 N/10 mm or more (for example, 1.0 N/10 mm to 2.5 N/10 mm), and particularly preferably 1.1 N/10 mm or more. When the adhesive strength against aluminum foil after immersion is less than the above range, the tape is easily peeled in the electrolytic solution and thus it becomes difficult to suppress the deterioration of the electrolytic solution.

In addition, the thickness change ratio (swelling ratio) of the pressure-sensitive adhesive tape for battery according to the present invention after immersion in a mixed solvent of ethylene carbonate/diethyl carbonate [former/latter (volume ratio)=1/1] at 60° C. for 8 hours is 20% or less, preferably 15% or less, particularly preferably 10% or less, and most preferably 5% or less. When the thickness change ratio is more than the above range, the tape may press the positive and negative electrodes after immersion to impart stress thereto and, due to the stress, the destruction of the positive and negative electrode active materials and the separator, decrease in close adhesiveness between the collector and the active materials, and the like may occur, so that the lowering of the battery properties tends to be caused.

In the pressure-sensitive adhesive tape for battery according to the present invention, a separator (release liner) may be provided on the surface of the pressure-sensitive adhesive layer in view of protection of the surface of the pressure-sensitive adhesive layer and prevention of blocking. The separator is removed when the pressure-sensitive adhesive tape for battery according to the present invention is attached to an adherend, and may not necessarily be provided. The separator to be used is not particularly limited, and a known and commonly used release paper or the like may be used. For example, there can be used a substrate having a release layer such as a plastic film or paper, of which surface is treated with a release agent such as silicone-based, long chain alkyl-based, fluorine-based, and molybdenum sulfide-based; a low adhesive substrate formed of a fluorine-based polymer such as polytetrafluoroethylene, polychlorotrifluoroethylene, polyvinyl fluoride, polyvinylidene fluoride, tetrafluoroethylene-hexafluoropropylene copolymer, and chlorofluoroethylene-vinylidene fluoride copolymer; and a low adhesive substrate formed of a non-polar polymer such as olefine-based resins (for example, polyethylene and polypropylene).

In the case where the pressure-sensitive adhesive tape for battery according to the present invention is a double-coated pressure-sensitive adhesive tape, the separator may be provided on the surfaces of both of the pressure-sensitive adhesive layers of the pressure-sensitive adhesive tape for battery according to the present invention. Alternatively, a separator having a rear side-release layer may be provided on one pressure-sensitive adhesive surface of the pressure-sensitive adhesive tape, such that the rear side-release layer of the separator comes into contact with the surface of the other pressure-sensitive adhesive surface on the opposite surface of the pressure-sensitive adhesive tape by winding the sheet.

The pressure-sensitive adhesive tape for battery according to the present invention is suitably used for, for example, manufacturing a secondary battery such as a lithium ion battery, in which a non-aqueous electrolytic solution is enclosed.

The non-aqueous electrolytic solution is not particularly limited and may be, for example, a electrolytic solution containing: a mixed solvent of a cyclic carbonate such as propylene carbonate (PC) and ethylene carbonate (EC) and a chain carbonate such as dimethyl carbonate (DMC), ethyl methyl carbonate (EMC) and diethyl carbonate (DEC); and a lithium salt such as LiPF$_6$ as a electrolyte dissolved in the mixed solvent.

The non-aqueous electrolytic solution secondary battery such as the lithium ion battery has a configuration that a laminate type electrode group in which a positive-electrode plate obtained by applying a positive electrode active material on a positive-electrode core body and a negative-electrode plate obtained by applying a negative electrode active material on a negative-electrode core body are laminated with a separator therebetween or a winding type electrode group in which a positive-electrode plate obtained by applying a positive electrode active material on a positive-electrode core body and a negative-electrode plate obtained by applying a negative electrode active material on a negative-electrode core body are provided facing each other with a separator therebetween and they are wound in a vortex form; electrode terminals drawn from the positive-electrode plate and the negative-electrode plate; and an electrolytic solution, are sealed in an external can.

Figure 3:
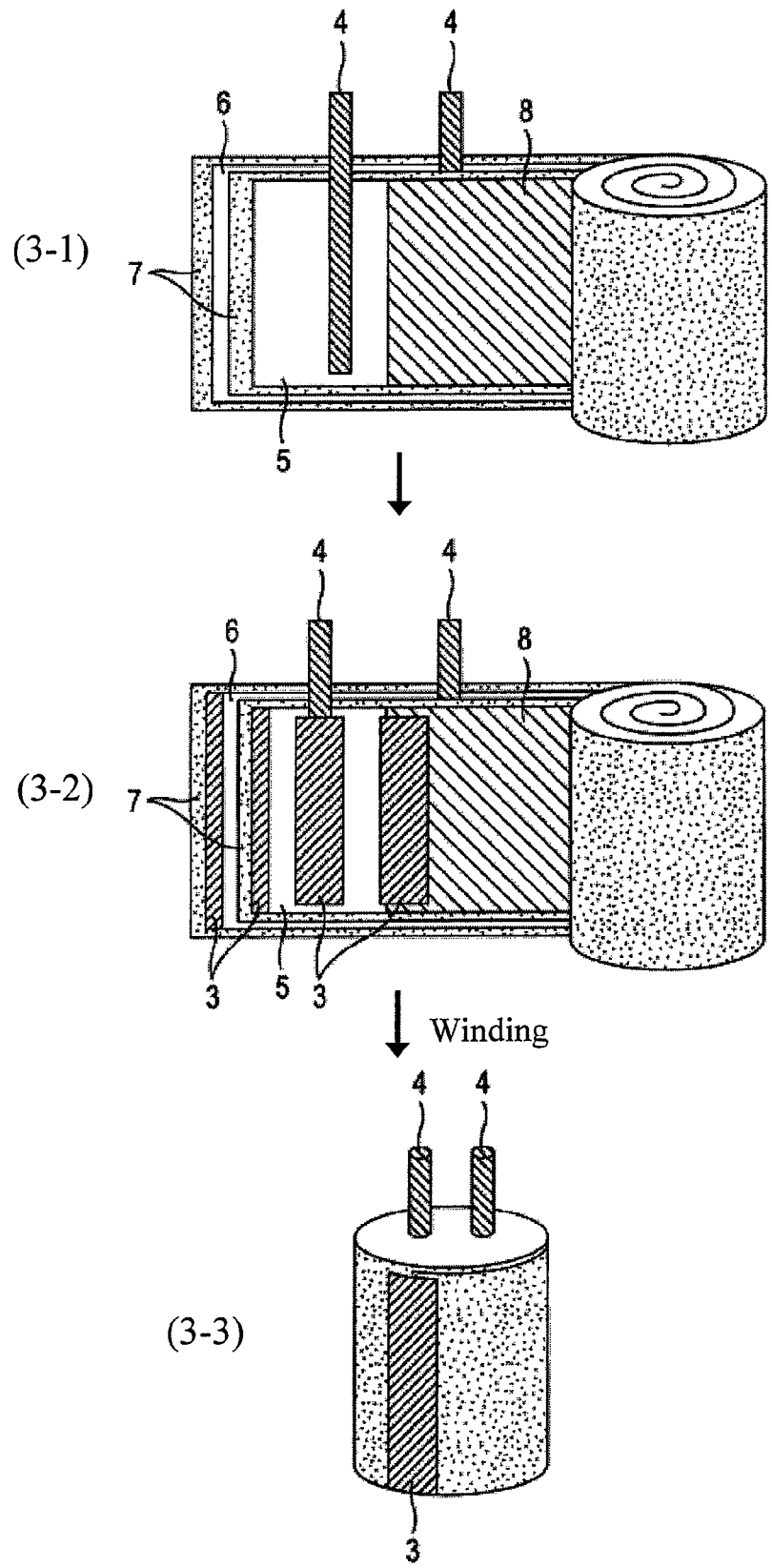
FIG. 3 is schematic view showing an example of the use of the pressure-sensitive adhesive tape for battery according to the present invention in a lithium ion battery. (3-1) is a view before use; (3-2) is a view showing attachment of the pressure-sensitive adhesive tape for battery according to the present invention to an electrode plate or the like; and (3-3) is a view showing the electrode plate wound and fixed by using the pressure-sensitive adhesive tape for battery according to the present invention.

The pressure-sensitive adhesive tape for battery according to the present invention can be used with attaching it to a battery-constituting member, for example, for the purpose of preventing penetration of an impurity, a burr or the like to a separator, for the purpose of preventing stripping-off of the active material, and for the purpose of improving insertion competence of an electrode into a battery case (for example, for fixing the laminated body having a construction of positive electrode plate/separator/negative electrode plate or fixing the winding body of the laminated body), in the manufacturing process of the above non-aqueous electrolytic solution secondary battery such as the lithium ion battery. The attachment position in the battery-constituting member is not particularly limited as long as the above object can be accomplished. Examples of the position include an electrode plate, an electrode terminal, an electrode plate end, a portion of the separator with which the electrode plate end is in contact, a boundary part between a portion to which an active material is applied and a portion to which the active material is not applied, a winding end of the winding type electrode group, etc. (refer to FIG. 3).

EXAMPLES

Hereinafter, the present invention is described in detail with reference to Examples, but the present invention should not be construed as being limited thereto.

Example 1

Using maleic acid-modified SEBS (1) (SEBS graft-modified with maleic acid, trade name: "ARON MELT PPET1600", manufactured by Toagosei Co., Ltd.) as an adhesive agent, it was applied on a polypropylene film (trade name: "TORAYFAN", manufactured by Toray Industries, Inc., thickness: 20 μm) as a substrate so that the thickness after drying was 10 μm, and dried, to thereby prepare a pressure-sensitive adhesive tape (1).

Example 2

An acrylic pressure-sensitive adhesive agent (1) was prepared by adding 2 parts by weight of an isocyanate-based crosslinking agent (trade name: "CORONATE L", manufactured by Nippon Polyurethane Industry Co., Ltd.) to 100 parts by weight of an acrylic copolymer containing 2-ethylhexyl acrylate/acrylic acid (95 parts by weight/5 parts by weight) as constituting monomers.

A pressure-sensitive adhesive tape (2) was prepared in the same manner as in Example 1, except that the above acrylic pressure-sensitive adhesive agent (1) was used as an adhesive agent.

Example 3

A rubber-based pressure-sensitive adhesive agent (1) was prepared by dissolving polyisobutylene (trade name: "OPANOL B80EP", manufactured by BASF Japan Ltd.) in toluene.

A pressure-sensitive adhesive tape (3) was prepared in the same manner as in Example 1, except that the above rubber-based pressure-sensitive adhesive agent (1) was used as an adhesive agent.

Example 4

An acrylic pressure-sensitive adhesive agent (2) was prepared by adding 2 parts by weight of an isocyanate-based crosslinking agent (trade name: "CORONATE L" manufactured by Nippon Polyurethane Industry Co., Ltd.) to 100 parts by weight of an acrylic copolymer containing butyl acrylate/acrylic acid (100 parts by weight/5 parts by weight) as constituting monomers.

A pressure-sensitive adhesive tape (4) was prepared in the same manner as in Example 1, except that the above acrylic pressure-sensitive adhesive agent (2) was used as an adhesive agent.

Example 5

A pressure-sensitive adhesive tape (5) was prepared in the same manner as in Example 1, except that maleic acid-modified SEBS (2) (SEBS graft-modified with maleic acid, trade name "FG1924GT", manufactured by Kraton Polymer Japan, Ltd.) was used as an adhesive agent.

Example 6

A pressure-sensitive adhesive tape (6) was prepared in the same manner as in Example 2, except that a polyethylene terephthalate film (trade name "LUMIRROR S10", manufactured by Toray Industries, Inc., thickness: 12 μm) was used as a substrate.

Example 7

A pressure-sensitive adhesive tape (7) was prepared in the same manner as in Example 2, except that a polyphenylene sulfide film (trade name "TORELINA", manufactured by Toray Industries, Inc., thickness: 16 μm) was used as a substrate.

Example 8

A pressure-sensitive adhesive tape (8) was made in the same manner as in Example 2, except that a polyimide film (trade name "KAPTON 50H", manufactured by Dupont-Toray Industries, Co., Ltd., thickness: 12 μm) was used as a substrate.

Example 9

An acrylic pressure-sensitive adhesive agent (3) was prepared by adding 0.2 parts by weight of epoxy-based crosslinking agent (trade name: "TETRAD-C", manufactured by MITSUBISHI GAS CHEMICAL COMPANY, INC) to 100 parts by weight of an acrylic copolymer containing 2-ethylhexyl acrylate/acrylic acid (95 parts by weight/5 parts by weight) as constituting monomers.

A pressure-sensitive adhesive tape (9) was prepared in the same manner as in Example 1, except that the above acrylic pressure-sensitive adhesive agent (3) was used as an adhesive agent.

Comparative Example 1

An acrylic pressure-sensitive adhesive agent (4) was prepared by adding 2 parts by weight of an isocyanate-based crosslinking agent (trade name: "CORONATE L" manufactured by Nippon Polyurethane Industry Co., Ltd.) to 100 parts by weight of an acrylic copolymer containing 2-ethylhexyl acrylate/ethyl acrylate/hydroxyethyl acrylate (30 parts by weight/70 parts by weight/5 parts by weight) as constituting monomers.

A pressure-sensitive adhesive tape (10) was prepared in the same manner as in Example 1, except that the above acrylic pressure-sensitive adhesive agent (4) was used as an adhesive agent.

Comparative Example 2

An acrylic pressure-sensitive adhesive agent (5) was prepared by adding 2 parts by weight of an isocyanate-based crosslinking agent (trade name: "CORONATE L", manufactured by Nippon Polyurethane Industry Co., Ltd.) to 100 parts by weight of an acrylic copolymer containing 2-ethylhexyl acrylate/ethyl acrylate/hydroxyethyl acrylate (50 parts by weight/50 parts by weight/5 parts by weight) as constituting monomers.

A pressure-sensitive adhesive tape (11) was prepared in the same manner as in Example 1, except that the above acrylic pressure-sensitive adhesive agent (5) was used as an adhesive agent.

Comparative Example 3

A rubber-based pressure-sensitive adhesive agent (2) was prepared by adding 20 parts by weight of a tackifying resin (trade name: "ARKON P-125", manufactured by Arakawa Chemical Industries, Ltd.) to 100 parts by weight of SEPS (trade name: "SEPTON 2005", manufactured by Kuraray Co., Ltd.) and stirring them until a homogeneous solution.

A pressure-sensitive adhesive tape (12) was prepared in the same manner as in Example 1, except that the above rubber-based pressure-sensitive adhesive agent (2) was used as an adhesive agent.

Comparative Example 4

A pressure-sensitive adhesive tape (13) was prepared in the same manner as in Example 1, except that an amine-modified SEBS (a terminal amine-modified product of SEBS, trade name "TUFTEC MP-10", manufactured by Asahi Kasei Chemicals Corporation) was used as an adhesive agent.

For the pressure-sensitive adhesive tapes obtained in Examples and Comparative Examples, resistance properties against electrolytic solution were evaluated by the following method.

The test samples were obtained by attaching the pressure-sensitive adhesive tapes obtained in Examples and Comparative Examples to a surface of an aluminum foil with imparting a pressure of 2 kg/cm2 for 2 seconds. The pressure-sensitive adhesive tapes of Examples 1 and 5 and Comparative Examples 3 and 4 were adhered under the pressure at 130° C. and the other tapes were adhered under the pressure at ordinary temperature (25° C.).

For the obtained test samples, force required for peeling off the pressure-sensitive adhesive tapes from the aluminum foil surface [180° peeling adhesive strength (against aluminum foil)] (N/10 mm) was measured under the following conditions by means of a precision universal testing machine (trade name: "AUTOGRAPH AG-I", manufactured by Shimadzu Corporation), and was taken as adhesive strength before immersion.

(Peeling Conditions)
Temperature: ordinary temperature (25° C.)
Peel rate: 300 mm/min
Peel angle: 180°

Moreover, the above test samples were immersed at 60° C. for 8 hours in an electrolytic solution which was obtained by mixing ethylene carbonate and diethyl carbonate in a volume ratio (former:latter) of 1:1, and then were visually observed with checking whether lifting-off and stripping-off of the pressure-sensitive adhesive tapes were present or not.

Thereafter, the test samples in which the pressure-sensitive adhesive tapes were not peeled off were lifted up from the electrolytic solution and then washed with distilled water. Then, force required for stripping off the pressure-sensitive adhesive tapes from the aluminum foil surface [180° peeling adhesive strength (against aluminum foil)] (N/10 mm) was measured in the same manner as above, and was taken as adhesive strength after immersion.

Furthermore, the thickness ($T_1$) of the test samples was measured. Thereafter, the test samples were immersed at 60° C. for 8 hours in the electrolytic solution obtained by mixing ethylene carbonate and diethyl carbonate in a volume ratio (former:latter) of 1:1, and then the test samples were taken out. The surface of the test samples washed with distilled water and the samples were allowed to stand at room temperature (25° C.) for 10 minutes to thereby obtain test samples after immersion.

For the test samples after immersion, the thickness ($T_2$) was measured, and the thickness change ratio before and after immersion was calculated by the following equation.

Thickness change ratio (%)={$(T_2-T_1)/T_1$}×100

The above evaluation results are shown in the following Table 1.

TABLE 1

| | Thickness change ratio (%) | Adhesive strength before immersion (N/10 mm) | Adhesive strength after immersion (N/10 mm) |
|---|---|---|---|
| Example 1 | 1.2 | 1.32 | 2.20 |
| Example 2 | 2.9 | 1.87 | 1.79 |
| Example 3 | 1.8 | 1.09 | 1.05 |
| Example 4 | 12.3 | 1.85 | 1.12 |
| Example 5 | 1.2 | 1.53 | 2.41 |
| Example 6 | 4.5 | 2.20 | 1.98 |
| Example 7 | 3.1 | 2.00 | 1.92 |
| Example 8 | 3.5 | 1.51 | 1.43 |
| Example 9 | 7.5 | 1.32 | 0.75 |
| Comparative Example 1 | 48.8 | 1.02 | Peeled after 2 hours |
| Comparative Example 2 | 45.1 | 1.13 | Peeled after 3 hours |
| Comparative Example 3 | 1.3 | 1.96 | Peeled after 2 hours |
| Comparative Example 4 | 1.2 | 0.01 | Peeled after 0.5 hour |
| Reference Example 1 | 1.1 | — | — |

As Reference Example 1, the thickness change ratio (%) of the substrate, which was determined by immersing the substrate (a polypropylene film, trade name: "TORAYFAN", manufactured by Toray Industries, Inc., thickness: 20 μm) alone in the electrolytic solution, was also described.

While the present invention has been described in detail and with reference to the specific embodiments thereof, it will be apparent to one skilled in the art that various changes and modifications can be made therein without departing from the spirit and scope thereof.

The present application is based on Japanese Patent Applications No. 2011-041360 filed on Feb. 28, 2011, No. 2011-265355 filed on Dec. 4, 2011 and No. 2012-032009 filed on Feb. 16, 2012, and the entire contents thereof are incorporated herein by reference. And all references cited herein are incorporated in their entirety.

What is claimed is:

1. A pressure-sensitive adhesive tape for battery comprising:
   a substrate; and
   a pressure-sensitive adhesive layer provided on at least one side of the substrate,
   wherein the pressure-sensitive adhesive tape has a thickness change ratio of 20% or less after immersion in a mixed solvent of ethylene carbonate/diethyl carbonate [former/latter (volume ratio) =1/1] at 60° C. for 8 hours; and a 180° peeling adhesive strength (against aluminum foil, peel temperature: 25° C., peel rate: 300 mm/minute) of 0.5 N/10 mm or more after the above immersion,
   wherein the pressure-sensitive adhesive layer does not contain a tackifier,
   wherein the pressure-sensitive adhesive layer contains a crosslinking agent and an acrylic pressure-sensitive adhesive agent,
   wherein monomer components constituting the acrylic pressure-sensitive adhesive agent contain an alkyl (meth)acrylate ester having an alkyl group having 5 to 12 carbon atoms as a main monomer, and the main monomer has a content of 50 to 100 wt % based on the total amount (100 wt %) of the monomer components constituting the acrylic pressure-sensitive adhesive agent,
   wherein the acrylic pressure-sensitive adhesive agent contains a functional group-containing monomer as a monomer component constituting the acrylic pressure-sensitive adhesive agent, and the functional group-containing monomer has a content of from 3 wt % to 7 wt % based on the total amount of the monomer components.

2. A battery comprising a battery-constituting member and the pressure-sensitive adhesive tape for battery according to claim 1 attached to the battery-constituting member.

3. The battery according to claim 2, wherein the battery-constituting member contains an electrode plate and an active material, wherein the pressure-sensitive adhesive tape is attached to a boundary part between a portion to which the active material is applied and a portion to which the active material is not applied on the electrode plate.

4. The battery according to claim 2, wherein the battery-constituting member contains a laminated body having a structure of positive-electrode plate/separator/negative-electrode plate, wherein the laminated body or a winding body of the laminated body is fixed by the pressure-sensitive adhesive tape.

* * * * *